United States Patent [19]

Jancic et al.

[11] Patent Number: 4,776,177

[45] Date of Patent: Oct. 11, 1988

[54] METHOD OF FLUID COMPONENT SEPARATION BY CRYSTALLIZATION, AND CRYSTALLIZATION SEPARATING APPARATUS

[75] Inventors: Slobodan Jancic; Christian Ehrsam, both of Winterthur, Switzerland

[73] Assignee: Gebrüder Sulzer Aktiengesellschaft, Winterthur, Switzerland

[21] Appl. No.: 913,341

[22] Filed: Sep. 29, 1986

[30] Foreign Application Priority Data

Oct. 9, 1985 [CH] Switzerland .......................... 4359/85

[51] Int. Cl.[4] .............................. B01D 9/04; C02F 1/22
[52] U.S. Cl. ......................................... 62/123; 62/527; 62/532; 138/38; 165/177
[58] Field of Search .................. 62/123, 527, 532; 165/177; 138/38

[56] References Cited

U.S. PATENT DOCUMENTS

| 2,874,199 | 2/1959 | Tarr .................... 260/666 |
| 3,528,786 | 9/1970 | Satterwhite et al. ........ 23/302 |
| 3,621,664 | 4/1968 | Saxer .................... 62/542 |
| 3,891,394 | 5/1975 | Smith .................... 23/273 R |

FOREIGN PATENT DOCUMENTS

| 516278 | 1/1953 | Belgium ................. 165/177 |
| 448458 | 5/1948 | Canada .................. 165/177 |
| 0124747 | 11/1984 | European Pat. Off. . |
| 494525 | 9/1919 | France ................... 165/177 |
| 1052023 | 1/1954 | France . |
| 1350756 | 12/1963 | France ................... 165/177 |
| 1362784 | 4/1964 | France ................... 165/177 |
| 526111 | 5/1955 | Italy .................... 165/177 |
| 289237 | 5/1965 | Netherlands ............. 165/174 |
| 425376 | 3/1935 | United Kingdom ......... 165/177 |
| 491870 | 9/1938 | United Kingdom ......... 165/177 |
| 2051597 | 1/1981 | United Kingdom . |

OTHER PUBLICATIONS

Brochure-Sulzer-MWB Crystallization Process for Solution of Separation Problems, Switzerland, 1/1988.

*Primary Examiner*—Ronald C. Capossela
*Attorney, Agent, or Firm*—Frishauf, Holtz, Goodman & Woodward

[57] ABSTRACT

In the tube (41) of a tube assembly of a crystallization apparatus, an insert (43) is provided which increases the effective surface in the interior of the tube (41). The insert has subsequent different sections (45, 46, 47). Seen in direction of flow the effective surface per unit of length of a subsequent section (46, 47) is larger than the effective surface of the previous section (45, 46). Because the heat removal by the coolant is a limiting factor for the kinetics of crystallization, the amount of crystals produced per unit of length of the tube is not substantially increased by the insert, but a smaller linear growth velocity is obtained at the surface of the crystals. This provides for better conditions for forming clean crystals. The inserts (343, 443 . . . 1243), preferably, are longitudinal sheet elements, for example of star, corrugated ring or similar shape which, in turn, may be formed with fine corrugations or pleats and/or perforations (54), of stainless sheet steel or, if attacked by the liquid flowing through the apparatus, graphite or polyvinylchloride, for example.

18 Claims, 9 Drawing Sheets

METHOD OF FLUID COMPONENT SEPARATION BY CRYSTALLIZATION, AND CRYSTALLIZATION SEPARATING APPARATUS

Reference to related patent, the disclosure of which is hereby incorporated by reference: U.S. Pat. No. 3,621,664, Saxer.

The present invention relates to a crystallization apparatus and to a method to separate components within a fluid by crystallization, and more particularly to an improvement of the apparatus and method described in the referenced U.S. Pat. No. 3,612,664, Saxer, the disclosure of which is hereby incorporated by reference.

BACKGROUND

The referenced U.S. Pat. No. 3,612,664 describes a method and an apparatus to separate a crystallizable component from a liquid by fractional crystallization. The method now is industrially known as the Sulzer-MWB method, and, essentially, provides that a liquid is repeatedly fed through a crystallization apparatus. A crystal layer will separate out. After the crystal layer has reached a predetermined thickness, the crystal layer is melted. The apparatus utilizes a vertical pipe assembly. The liquid is fed through the pipe. A heat transfer medium is applied to the outside of the pipes to cool the pipes during crystallization or, selectively, to heat the pipes during melting.

It has been found, in operation, that as the crystallized layer increases in thickness on the tube walls, heat transferred to the tube walls is decreased. As the layer builds up, the efficiency of separation by crystallization decreases. Additionally, some materials cause problems in starting crystallization; at times, the formation of crystals which is desired is not obtained.

THE INVENTION

It is an object to improve the crystallization apparatus and the method, for example, as described in the referenced U.S. Pat. No. 3,612,664, so that the efficiency of the apparatus is increased, and the onset of crystallization reliably takes place. Further, the number of tubes necessary to perform a certain crystallization duty should be reduced, while maintaining the same plant capacity. The loading of the crystals in the tubes, even for materials which do not adhere well to the walls of the tubes, should be improved.

Briefly, the flow through the tubes is guided and, to some extent, impeded, by providing, within the tubes, guide and/or obstruction surfaces. The guide surfaces increase the effective surface area within the tubes and are preferably coupled to the tube walls so that good heat transfers between the guide surfaces and the tube walls is obtained. In some cases, the guide surfaces may be corrugated and/or perforated, which tends to improve the formation of crystals and adherence thereof to crystallizer tubes. The industrial experience has shown that the crystal mass growing inside the crystallizer tubes poses ever increasing resistance to heat transfer. This can be compensated by increasing the temperature difference between the crystallizing liquid and the heat transfer medium. In some cases such compensations lead to decrease in the separation efficiency. Furthermore, under such conditions, certain substances exhibit unpredictable onset of layer growth and some substances are almost impossible to crystallize in the layer form.

Heat removable by a coolant, surrounding the tubes through which the liquid to be crystallized is passed, is a limiting factor for the kinetics of crystal formation. The rate of crystal production per unit of length of the tube is not substantially increased by the inserts; however, smaller linear growth velocity is obtained at the crystal surface, which improves the purity of the crystals obtained. Concentration of impurities at the boundary layer of the growing crystals is substantially suppressed. The inserts permit a high loading of the tubes with crystals even if the crystals, initially, would not adhere well to the walls of a smooth tube.

In accordance with a feature of the invention, different insert sections are located within the tubes and arranged so that the effective surface per unit of length of subsequent insert sections is, in direction of liquid flow, larger than the effective surface of preceding sections. This arrangement has the advantage that no overheating of mass to be crystallized in the upper section of the tube need take place to prevent subsequent undercooling and the consequent build-up of impurity substructures. The progressive increase of the surface from insert to insert also improves adhesion of the crystals, which, again, permits an increase of the loading ability of the tubes.

The invention is particularly suitable for use in carrying out the "Sulzer-MWB" method, as explained, for example, in the referenced U.S. Pat. No. 3,612,664.

In accordance with a preferred embodiment, the inserts are formed as structural elements which extend from the tube walls towards the interior. This has the advantage that when the tube wall is covered by growing crystals, heat transfer takes place by conduction through the structural inserts. Suitable materials for the structural elements are, for example, steel, such as stainless steel; for treatment of liquids which are corrosive, non-metallic inserts may be used, for example made of graphite or polyvinylchloride (PVC). The material of the inserts should have a higher heat conductivity that the crystals which form thereon.

It is of advantage to form the inserts so that they have contact surfaces in the region of the tube walls to insure good heat transfer to the tube walls. Preferably, the inserts are perforated. The perforations may have many shapes, depending on both the liquid with which they are used and on the type of crystals that are formed. Perforations facilitate distribution of the liquid both at the initiation of crystallization and during growth. They also permit a high loading of the tubes.

Instead of perforations, or in addition to perforations, the surface of the inserts can be non-planar, for example corrugated, serrated, or the like. The same general advantage as that of perforations pertains, namely to facilitate distribution of the liquid and improve the loading ability of crystallizer tubes.

The inserts can be made of sheet metal, or sheet plastic, so that the manufacture therof is inexpensive. A particularly simple insert is formed by a multiple folded sheet metal element. The cross section of the insert may, for example, have the form of a star. In the region of the tube walls, a capillary effect is obtained in the folds, which decelerates the flow velocity of the liquid, so that it is locally supercooled, thereby facilitating the initiation of crystallization.

DRAWINGS

DETAILED DESCRIPTION

Figure 1:
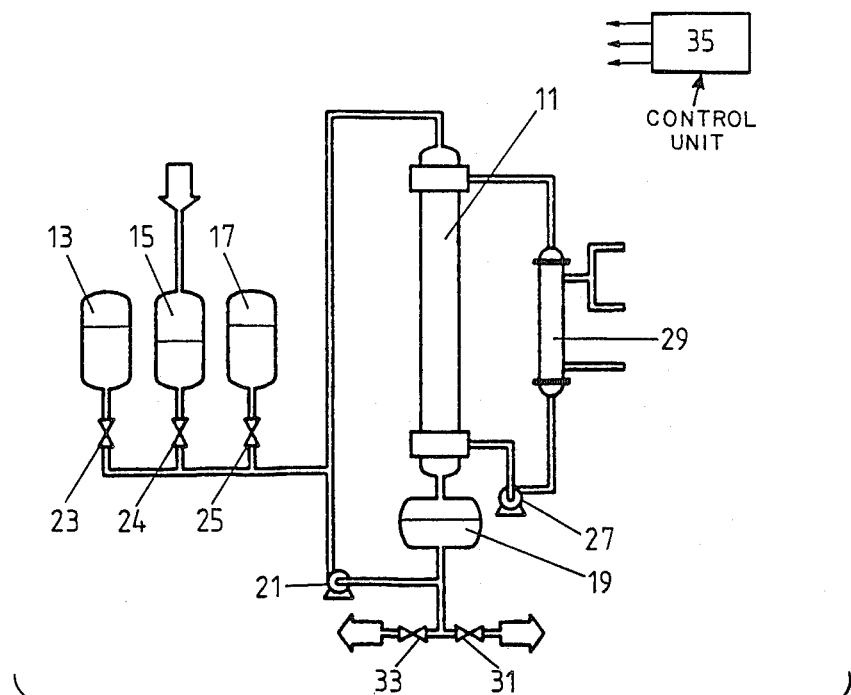
FIG. 1 is a general, highly schematic diagram of a fractional crystallization apparatus of the prior art, which can be improved in accordance with the present invention.

The present invention is applicable for use in an apparatus as shown in FIG. 1. FIG. 1 illustrates highly schematically the apparatus to carry out the Sulzer-MWB crystallization method. For a detailed description, reference is made to the Saxer Pat. No. 3,621,664. Tanks 13, 15, 17 temporarily store fractions from collecting tank 19. A circulating pump 21 maintains flow through the crystallizer 11. Valves 23, 24, 25 control flow into or out of the tanks 13, 15, 17. A heat transfer medium is fed by pump 27 to a heat exchanger 29 and then to the crystallization apparatus 11. The heat transfer medium may cool or heat the contents of the crystallizer 11. After carrying out crystallization cycles, the clean product can be removed through valve 31. Mother liquor can be removed through valve 33. The operation of the respective pumps and valves is actuated electrically by a control unit 35, which ensures implementation of a prescribed separation algorithm. The crystallization steps are explained in detail in the referenced Saxer patent.

The crystallization apparatus 11 is not shown in detail; generally, it comprises a pipe assembly with a plurality of tubes in which liquid can flow as a falling film or as a full flow. The walls of the tubes present a heat exchange surface across which the heat is transfered by circulating the heat exchange medium by pump 27.

Figure 2:
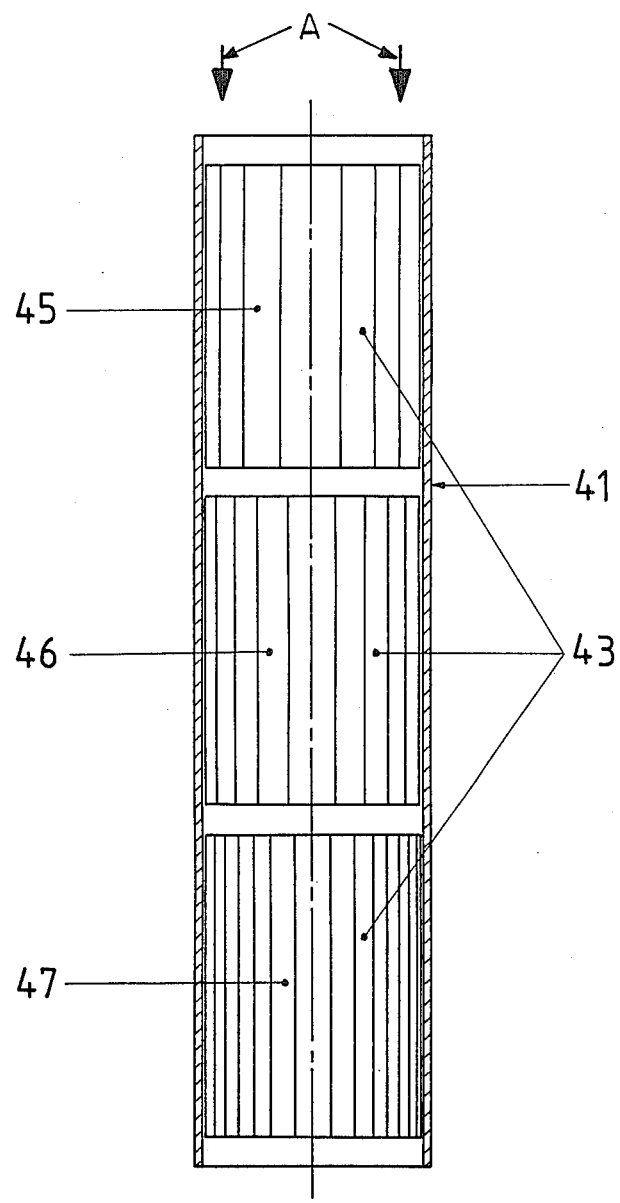
FIG. 2 is a vertical cross-sectional view through a tube of the crystallization apparatus, and illustrates various inserts.

In accordance with the present invention, the tubes 41 within the crystallizer 11 contain inserts 43 which increase the effective surface of the interior of the tubes. The inserts 43, as seen in FIG. 2, are placed longitudinally in three sections 45, 46, 47 which differ from each other. The lowest section 47 has the largest effective surface, section 46 has somewhat smaller effective surface, and section 45 still smaller. Thus, the effective interior surface of the tubes 41 increases in the direction of flow. Flow direction is shown by the arrows A in FIG. 2.

The inserts 43 may have various shapes and configurations, in dependence on the properties of the liquid to be treated and crystals obtained during such treatment. The various embodiments are illustrated in FIGS. 3 to 12, and similar elements have been given the same decimal and unit value numbers, incremented by the Figure number forming the first two significant digits of the respective reference numerals.

Figure 3:
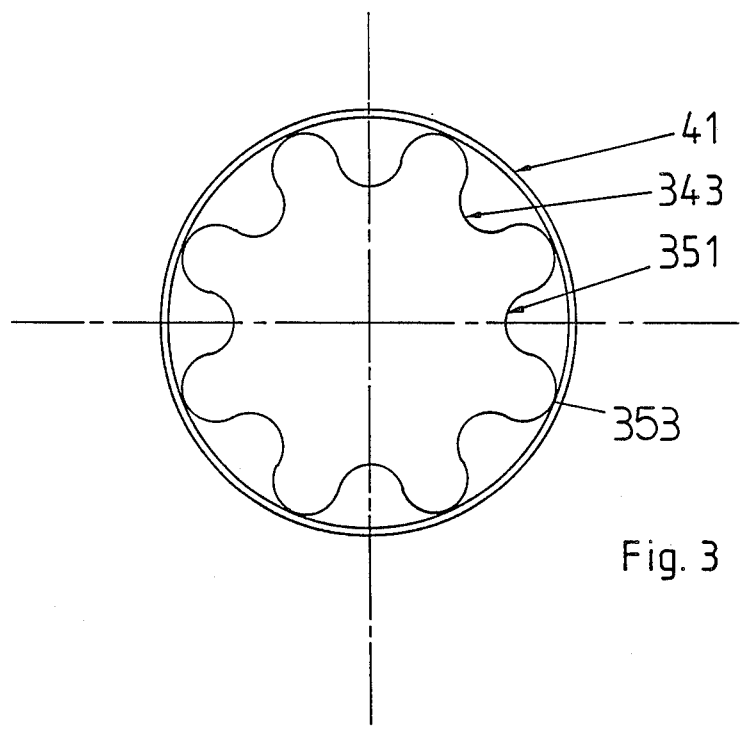
FIG. 3 is a horizontal cross-sectional view through one of the tubes, and illustrates a possible type of insert.
Figure 4:
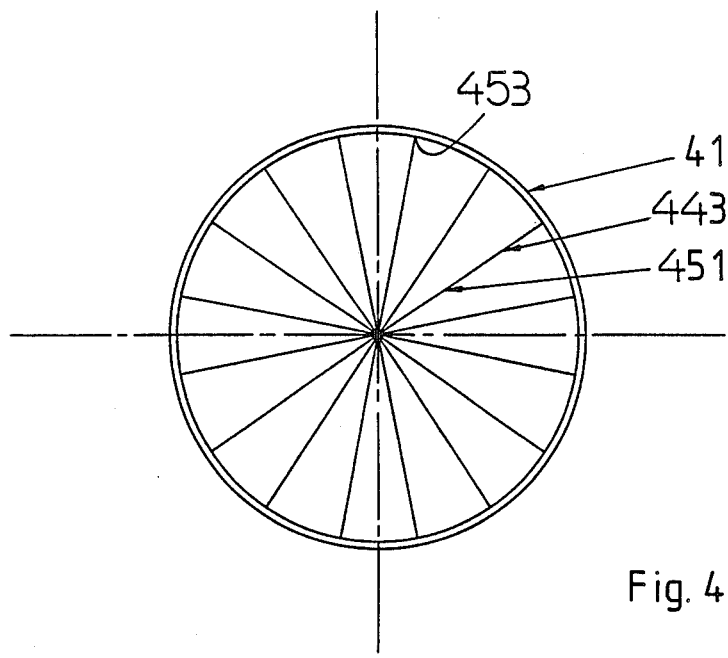
FIG. 4 through 12 are horizontal cross-sectional views similar to FIG. 3, illustrating other possible types of inserts.
Figure 5:
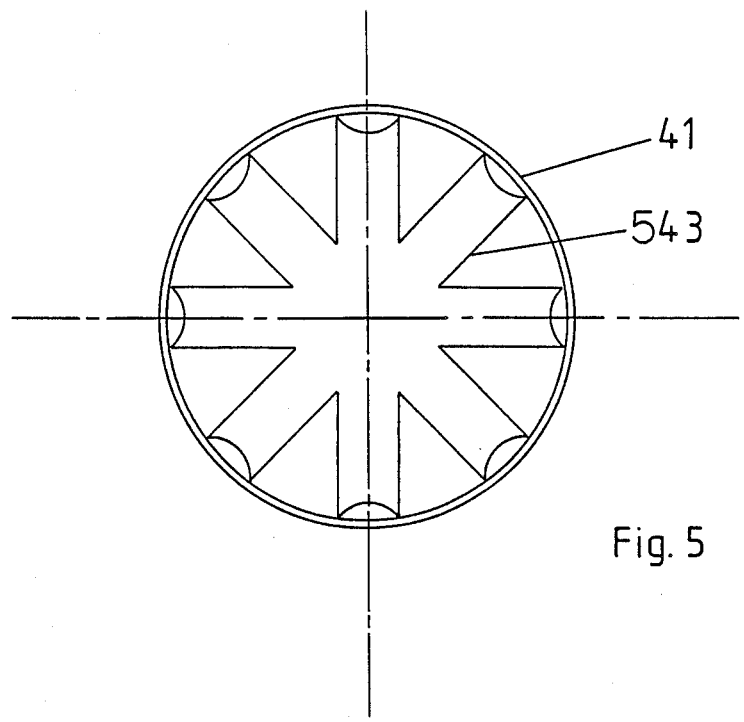
Figure 6:
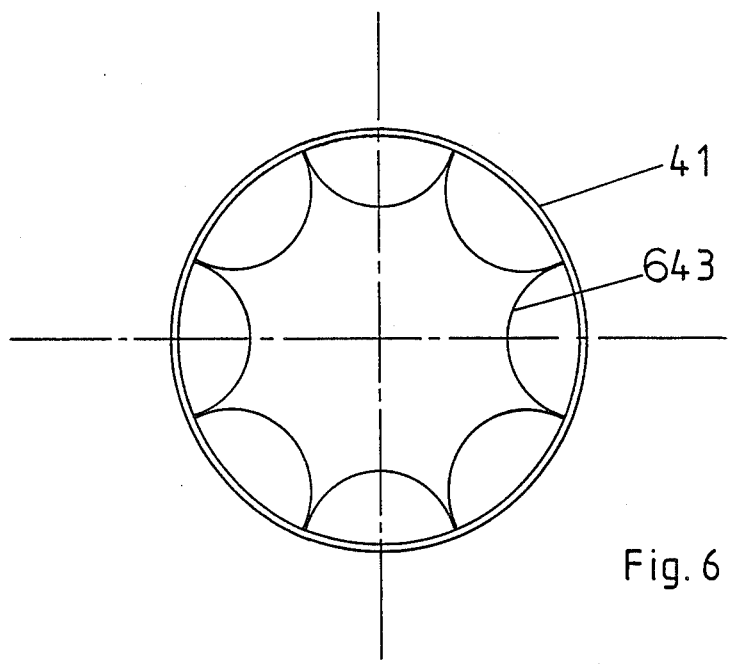
Figure 7:
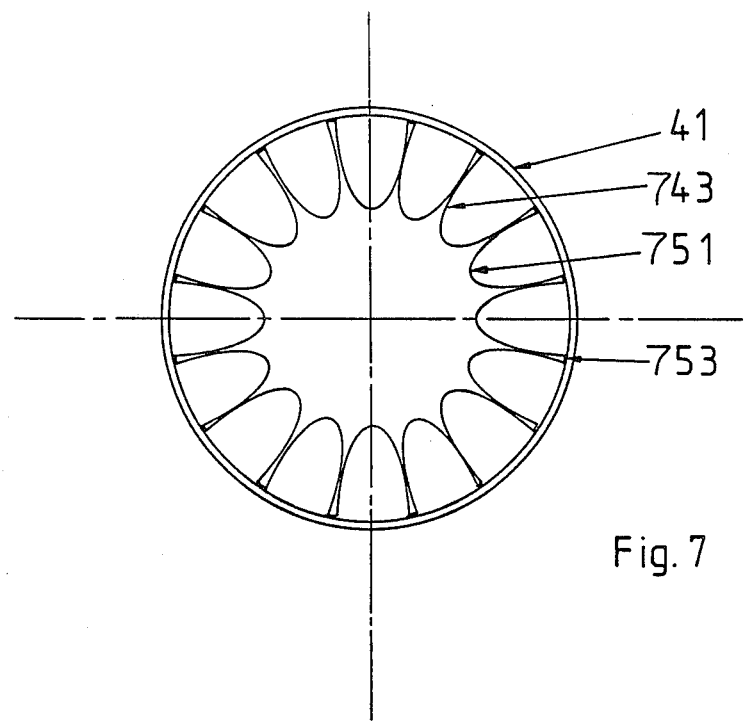

FIG. 3 shows the pipe 41, with inserts 343, formed by structural elements 351. The elements 351, in the form of a corrugated ring, extend from the walls of the tube or pipe 41 to the interior to provide for heat transfer also when a relatively thick crystal layer is present. The structural elements 351 contact the inner surfaces of the pipes 41 at 353 to improve heat transfer. It is sometimes of advantage to form the inserts of the type as 743 and 843 with special contact surfaces 753, 853 (FIGS. 7, 8) to provide for intimate contact with the tube walls and insure effective heat transfer.

Figure 8:
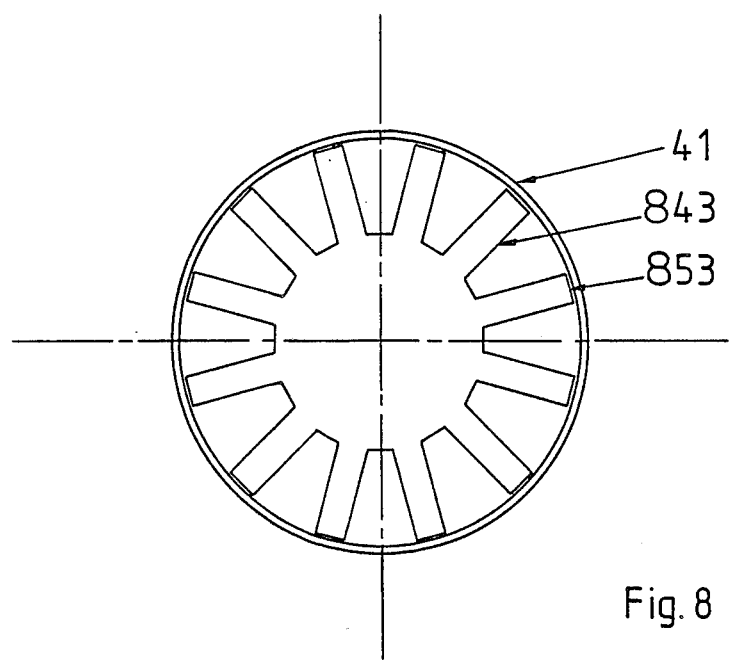
Figure 9:
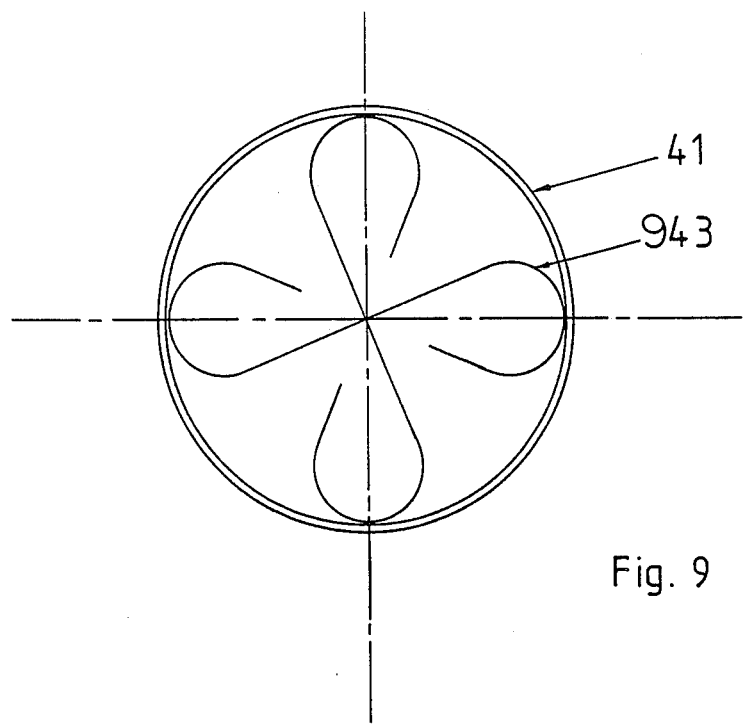
Figure 10:
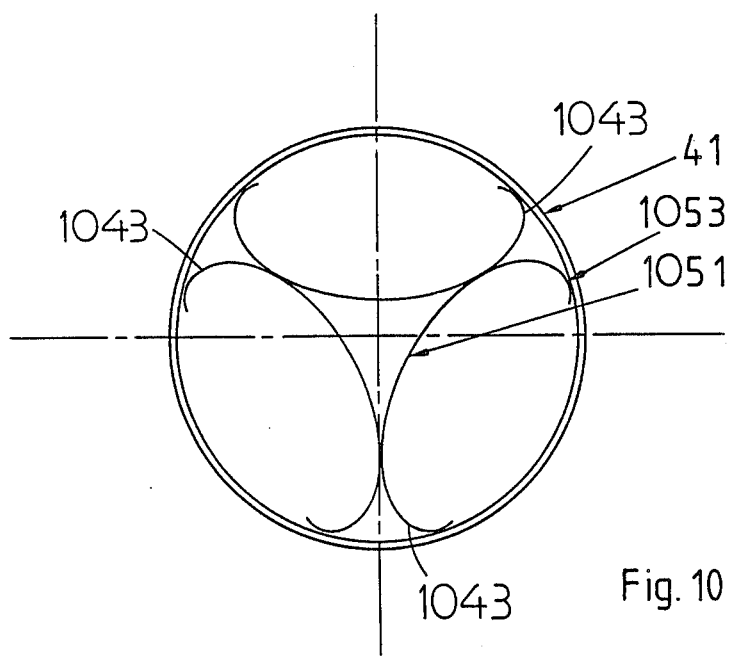
Figure 11:
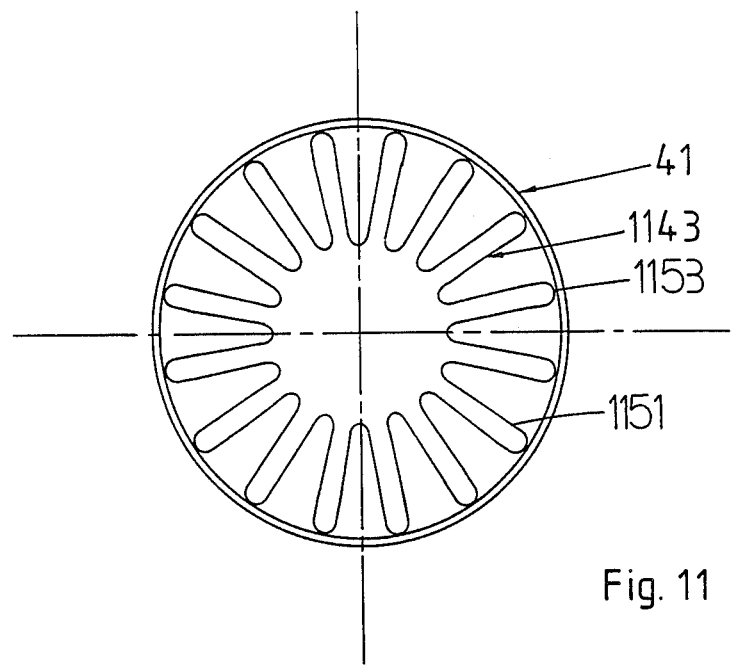
Figure 12:
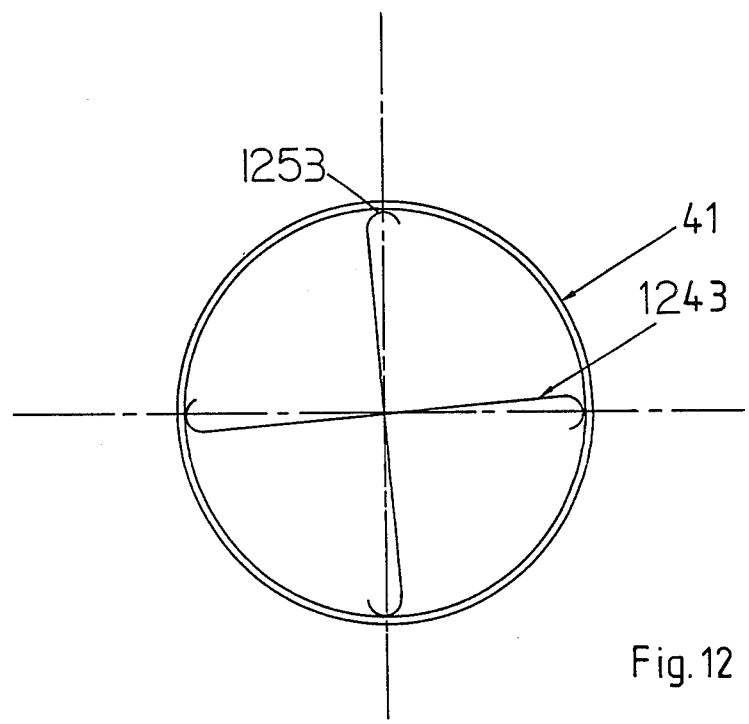

In certain applications the inserts 443 may be formed as star-shaped structural elements 451 (FIG. 4), as a double-wall hollow star 543 (FIG. 5), as an internal scallop 643 (FIG. 6) with widely spaced lobes, as a structural element 751 with flattened end surfaces 753, as shown by the insert 743 (FIG. 7) or as a double-wall star-shaped element 843 with tube engaging end surfaces 853 (FIG. 8). The inserts may be formed by one or more S-shaped elements 943 (FIG. 9) or by internal cylindrical open or closed tubular elements 1051 (FIG. 10) which have surfaces engaging the interior of the tube 41, as seen as 1053. The tubular elements of FIG. 10, in cross section, may form a complete or partially complete oval or, essentially, an ellipse, A circular pleat insert is shown at 1143 (FIG. 11) which, also, can provide for heat transfer surfaces engaging the wall 41 at 1153. The S-shaped insert 943 of FIG. 9 may be applied, essentially, by a star element 1243 (FIG. 12) with only a small end engaging surface 1253 to fit against the inner wall of the tube 41.

Figure 13:
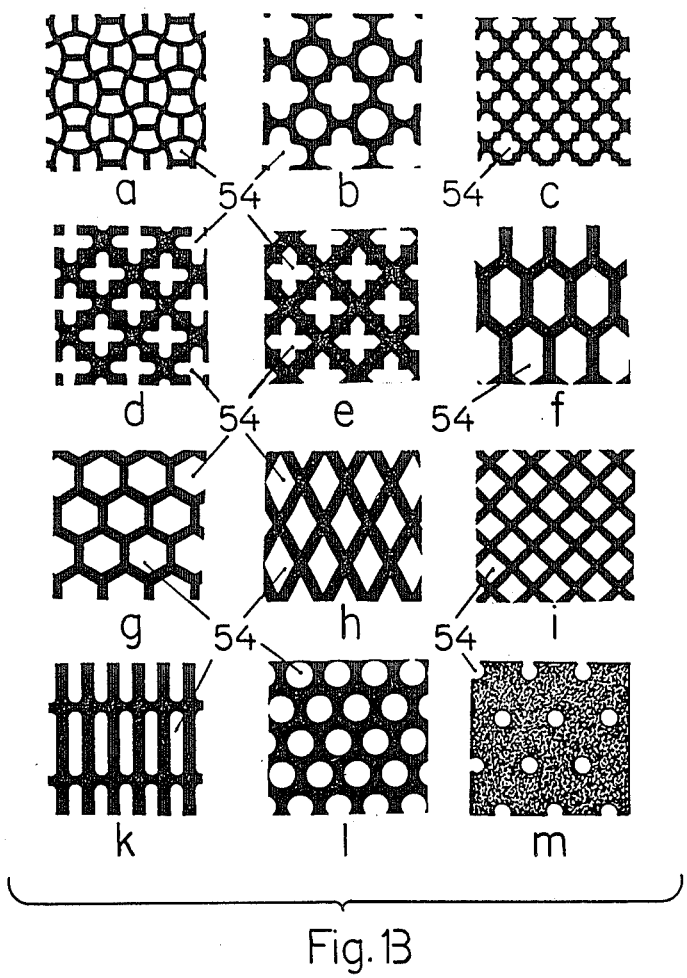
FIG. 13 illustrates, in Figure patterns a through m, various types of perforations which can be formed in any one of the inserts.
Figures 14A, 14B:
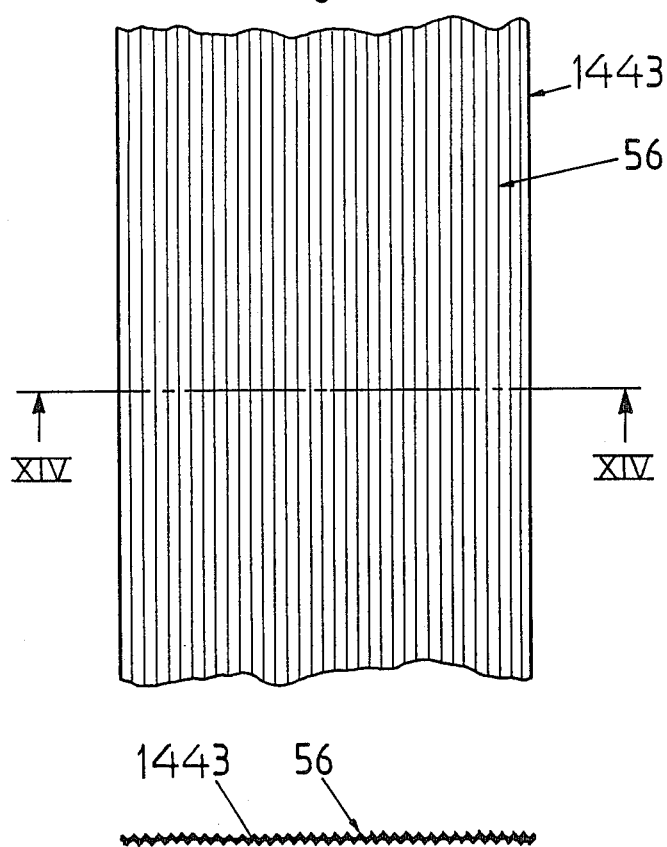
FIG. 14a is a plan view of a corrugated insert
FIG. 14b is a cross-sectional view of the sheet of FIG. 14a taken along line XIV—XIV, the element of FIG. 14a being a strip of pleated sheet metal to form corrugations.

The inserts typically are made of sheet metal. The inserts may be formed with perforations 54a through 54m (FIG. 13). FIG. 13 shows various suitable perforation patterns which, generally, can be in the shape of standard perforations of panels, such as aluminium radiator panels or the like, grids, or other suitable shapes. The various patterns are clearly seen in FIG. 13 and have been labeled a to m. The surfaces of the inserts need not be plane or flat, but may be corrugated, ribbed or serrated; FIG. 14a is a plan view of a side of an insert of the structural element 451 of the insert 453 (FIG. 4) although, of course, the insert elements 1443 of FIG. 14a may be used in any of the embodiments heretofore described. The insert 1443, formed with corrugations 56, as best seen in FIG. 14b, can be continuous or, in addition to the corrugations, may be formed with perforations, for example of any one of the patterns a to m of FIG. 13.

A suitable material for the insert is any sheet material, for example sheet metal, and preferably stainless steel. The sheet metal, as illustrated in FIGS. 14a, 14b, may be corrugated and then bent, folded or shaped in any suitable way, as illustrated in FIGS. 3 to 12. The corrugation shown in FIG. 3 is particularly suitable.

Some liquids which are corrosive may attack metal inserts; when such materials are to be handled, the inserts may be made of non-metallic material, for example graphite or polyvinylchloride. The material selected will depend on the substance to be purified by crystallization. The heat conductivity of the insert material should be better than that of the crystals which form on the inner walls of the tube 41 and/or of the inserts.

Various changes and modifications may be made, and features described in connection with any one of the embodiments may be used with any of the others, within the scope of the invention concept.

We claim:

1. Crystallization apparatus for separating a crystallizable component from a liquid, comprising a pipe assembly (11) having a plurality of pipes or tubes (41) located therein, in which the liquid can flow as a falling film or as a full pipe flow, and wherein, upon crystallization of the crystallizable component, a crystallization product adhering to the pipe or tube walls is formed, said apparatus further including means (27, 29) for providing heat transfer between the exterior of said pipes or tubes (41) and a heat transfer medium to effect crystallization of the crystallizable components;

and comprising means for enhancing crystallization of the crystallizable component in the liquid to thereby separate-out said crystallizable component from the liquid, including inserts (43, 343, . . . 1243) located within the pipes or tubes (41) for increasing the effective surface through which said liquid is flowing and to provide an effective surface area for growth of crystals of the crystallizable component as the liquid flows through the pipes or tubes.

2. The apparatus of claim 1, wherein the inserts are formed with an effective surface area which increases in the direction of liquid flow.

3. The apparatus of claim 2, wherein a plurality of insert sections (45, 46, 47) are located in the tubes, so that the insert sections, in the direction of liquid flow, have effective surfaces in subsequent insert sections which are larger per unit of length than the effective surface of an insert section upstream of said subsequent insert section.

4. The apparatus of claim 1, wherein the inserts comprise structural elements (351, 451 . . . 1243) extending from the interior surface of the wall of the pipe or tube (41) to the interior thereof.

5. The apparatus of claim 1, wherein the inserts (43) are formed with contact surfaces (353, 453 . . . 1253) engaging the inner surfaces of the tube walls in order to improve heat transfer.

6. The apparatus of claim 1, wherein the inserts (43) comprise sheet elements formed with perforations (54) therein.

7. The apparatus of claim 1, wherein the inserts (1443) comprise sheet elements formed with a non-planar surface.

8. The apparatus of claim 1, wherein the inserts (1443) comprise sheet elements which have a corrugated or pleated or serrated surface configuration.

9. The apparatus of claim 1, wherein the inserts comprise sheet metal.

10. The apparatus of claim 1, wherein the inserts (543, 743, 843, 1143) comprise multiple folded sheet material.

11. The apparatus of claim 1, wherein the inserts comprise non-metallic material comprising graphite or polyvinylchloride or non-metallic sheet material other than graphite and polyvinylchloride.

12. The apparatus of claim 1, wherein the inserts comprise a ring-shaped structure (351) with an undulating or deeply corrugated circumference defining projections and depressions between said projections, the projections engaging and contacting the inner walls of said tube or pipe (41).

13. The apparatus of claim 12, wherein the surface of said insert structure (351) is pleated or corrugated.

14. The apparatus of claim 13, wherein the insert structure is perforated.

15. The apparatus of claim 12, wherein the insert structure is perforated.

16. The apparatus of claim 12, wherein a plurality of insert sections (45, 46, 47) are located in the tubes, so that the insert sections, in the direction of liquid flow, have effective surfaces in subsequent insert sections which are larger per unit of length than the effective surface of an insert section upstream of said subsequent insert section.

17. The apparatus of claim 12, wherein the surface of at least one of said insert sections (45, 46, 47) is formed with at least one of pleats or corrugations or performations.

18. Crystallization apparatus for separating a crystallizable component from a liquid, comprising a collecting tank (19);

tank means (13, 15, 17) for temporarily storing fractions from the collecting tank, connected to said collecting tank;

a crystallization apparatus (11) including a pipe assembly having a plurality of pipes or tubes (41) located therein;

a circulating pump (21) pumping liquid from said collecting tank and, selectively, said tank means through said crystallization apparatus, and defining a recirculation loop or path;

valve means (23, 24, 25) selectively connecting said tank means to said recirculation loop or path;

a heat transfer medium (29) coupled to said crystallization apparatus for, respectively, cooling or heating the liquid being circulated in said recirculating loop or pump, the liquid flowing in said pipes or tubes as a falling film or as full pipe flow and wherein, upon crystallization of the crystallizable component from the liquid, crystallization products will form and adhere to the pipe or tube walls upon heat transfer between the exterior of said pipes or tubes and a heat transfer medium derived from said heat exchanger and applied to the crystallization apparatus, and comprising means for enhancing crystallization of the crystallizable component in the liquid to thereby separate-out said crystallizable component from the liquid, including inserts (43, 343, . . . 1243) located within the pipes or tubes (41) for increasing the effective surface through which said liquid is flowing and to provide an effective surface area for growth of crystals of the crystallizable component as the liquid flows through the pipes or tubes;

means (31) coupled to said collecting tank for selectively withdrawing liquid from said collecting tank;

and control means (35) controlling the temperature of the liquid and the crystallizable components crystallizing-out on the inner walls of said pipes or tubes and on said inserts for controlling crystal layer growth on said tube walls and said inserts, respectively.

* * * * *